United States Patent
Baba et al.

(10) Patent No.: US 12,297,329 B2
(45) Date of Patent: May 13, 2025

(54) CONTINUOUS HYDROLYZATION APPARATUS AND CONTINUOUS HYDROLYZATION METHOD

(71) Applicant: HONDA MOTOR CO., LTD., Tokyo (JP)

(72) Inventors: Tsuyoshi Baba, Wako (JP); Shoko Hiraoka, Wako (JP); Satoshi Ozaki, Wako (JP); Satoshi Hirawaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 485 days.

(21) Appl. No.: 17/680,560

(22) Filed: Feb. 25, 2022

(65) Prior Publication Data
US 2022/0306828 A1    Sep. 29, 2022

(51) Int. Cl.
*C08J 11/14*    (2006.01)
*B01J 19/20*    (2006.01)

(52) U.S. Cl.
CPC ............... *C08J 11/14* (2013.01); *B01J 19/20* (2013.01); *B01J 2219/00033* (2013.01); *C08J 2377/02* (2013.01)

(58) Field of Classification Search
CPC .................................. C08J 11/14; B01J 19/20
See application file for complete search history.

(56) References Cited

U.S. PATENT DOCUMENTS

| | | |
|---|---|---|
| 4,605,762 A | 8/1986 | Mandoki |
| 5,495,015 A | 2/1996 | Bassler et al. |
| 6,245,822 B1 | 6/2001 | Terada et al. |
| 2009/0131725 A1 | 5/2009 | Naka |
| 2016/0312319 A1 | 10/2016 | Kusuda et al. |

FOREIGN PATENT DOCUMENTS

| | | |
|---|---|---|
| CN | 1169719 A | 1/1998 |
| CN | 1233624 A | 11/1999 |
| CN | 104745642 A | 7/2015 |
| JP | H04-332630 A | 11/1992 |
| JP | H08-20023 A | 1/1996 |
| JP | H09-77905 A | 3/1997 |
| JP | H10-510280 A | 10/1998 |
| JP | 2002-322288 A | 11/2002 |
| JP | 2005-022245 A | 1/2005 |
| JP | 2006-289363 A | 10/2006 |
| JP | 2006-326499 A | 12/2006 |
| JP | 2009-125710 A | 6/2009 |
| JP | 2013-53210 A | 3/2013 |
| JP | 2013-203826 A | 10/2013 |
| JP | 2020-172606 A | 10/2020 |

OTHER PUBLICATIONS

Notice of Submission of Publications, etc. received in corresponding Japanese application No. 2021-044307 dated Sep. 3, 2024 (11 pages).
Japanese Office Action received in corresponding Japanese application No. 2021-044307 dated Oct. 22, 2024 with English translation (12 pages).
Chinese Office Action Dated May 7, 2023 issued in corresponding Chinese application No. 202210013311.6 (10 pages).
Japanese Office Action received in corresponding Japanese application No. 2021-044307 dated Mar. 25, 2025 with English translation (8 pages).

*Primary Examiner* — Sikarl A Witherspoon
(74) *Attorney, Agent, or Firm* — Rankin, Hill & Clark LLP

(57) ABSTRACT

A continuous hydrolyzation apparatus includes: a hydrolysis reaction container including a heating tube provided with a feed portion for a hydrolytic resin composition containing fibers and a feed portion for water; a screw inserted in the heating tube and configured to mix the hydrolytic resin composition with the water and to convey a mixture to a downstream side in the heating tube; and a back-pressure valve provided on a downstream side of the hydrolysis reaction container and configured to move the hydrolytic resin composition and the fibers to the downstream side while setting a pressure in the hydrolysis reaction container to a prescribed pressure to promote a hydrolysis reaction.

8 Claims, 3 Drawing Sheets

CONTINUOUS HYDROLYZATION APPARATUS AND CONTINUOUS HYDROLYZATION METHOD

CROSS-REFERENCE TO RELATED APPLICATIONS

This application is based upon and claims the benefit of priority from Japanese Patent Application No. 2021-044307 filed on Mar. 18, 2021; the entire contents of which are incorporated herein by reference.

BACKGROUND

The present disclosure relates to a continuous hydrolyzation apparatus and a continuous hydrolyzation method.

There has been known a batch-wise depolymerization apparatus for obtaining ε-caprolactam by depolymerization of nylon 6 under the presence of a catalyst such as phosphoric acid and an ionic liquid.

For example, according to a depolymerization apparatus disclosed in JPH10-510280A (Patent Document 1), in the course of recycling polycaprolactam-containing wastes, two processes of melting the wastes and compressing the wastes are carried out simultaneously in a conventional extruder that serves as a melting apparatus. Subsequently, the melt compressed in the melting apparatus is brought into contact with superheated water in a hydrolysis reaction container. The mixture discharged from the hydrolysis reaction container is fed to a decompression apparatus and then to a separation apparatus. Insoluble additives such as glass fibers, pigments, and other polymers are removed in the separation apparatus. The separation apparatus is formed from a conventional filter apparatus such as a belt filter, a back-washable tube filter, and other conventional filtering apparatuses that enable continuous or periodic discharge.

However, the above-mentioned depolymerization apparatus (see Patent Document 1, for example) conducts the depolymerization in a batch process by using a depolymerization reactor and a high volume process is therefore expected. Here, it is also expected to prevent unreacted substances from remaining in a reaction container.

Meanwhile, in the case of conducting the depolymerization reaction under the presence of the catalyst, the used catalyst needs to be separated and removed from the obtained depolymerization products containing ε-caprolactam. In the meantime, the batch-wise depolymerization apparatus that carries out the depolymerization reaction at an ordinary pressure under the presence of the catalyst may lead to an increase in size of the reaction container in an attempt to increase a yield of ε-caprolactam by boosting an amount of depolymerization of nylon 6 per batch.

SUMMARY

A continuous hydrolyzation apparatus includes: a hydrolysis reaction container including a heating tube provided with a feed portion for a hydrolytic resin composition containing fibers and a feed portion for water, and a screw inserted in the heating tube and configured to mix the hydrolytic resin composition with the water and to convey a mixture to a downstream side in the heating tube; and a back-pressure valve provided on a downstream side of the hydrolysis reaction container and configured to move the hydrolytic resin composition and the fibers to the downstream side while setting a pressure in the hydrolysis reaction container to a prescribed pressure to promote a hydrolysis reaction.

Meanwhile, a continuous hydrolyzation method includes providing a hydrolytic resin composition containing fibers; and continuously hydrolyzing the hydrolytic resin composition by kneading the hydrolytic resin composition and water by heat and pressure application while the hydrolytic resin composition and the water is conveyed from an upstream side to a downstream side of a heating tube by using a screw inserted into the heating tube.

BRIEF DESCRIPTION OF THE ACCOMPANYING DRAWINGS

DESCRIPTION OF EMBODIMENTS

Next, a continuous hydrolyzation apparatus and a continuous hydrolyzation method of a mode to carry out this disclosure (hereinafter this embodiment) will be described in detail.

The present disclosure will be specifically described in this embodiment based on examples of the continuous hydrolyzation apparatus and the continuous hydrolyzation method for hydrolyzing a fiber reinforced resin (a hydrolytic resin composition) containing nylon 6 and glass fibers. However, the continuous hydrolyzation apparatus and the continuous hydrolyzation method of the present disclosure are not limited to the foregoing and may be applied to other hydrolytic resin compositions to be described later.

<Continuous Hydrolyzation Apparatus>

Figure 1:
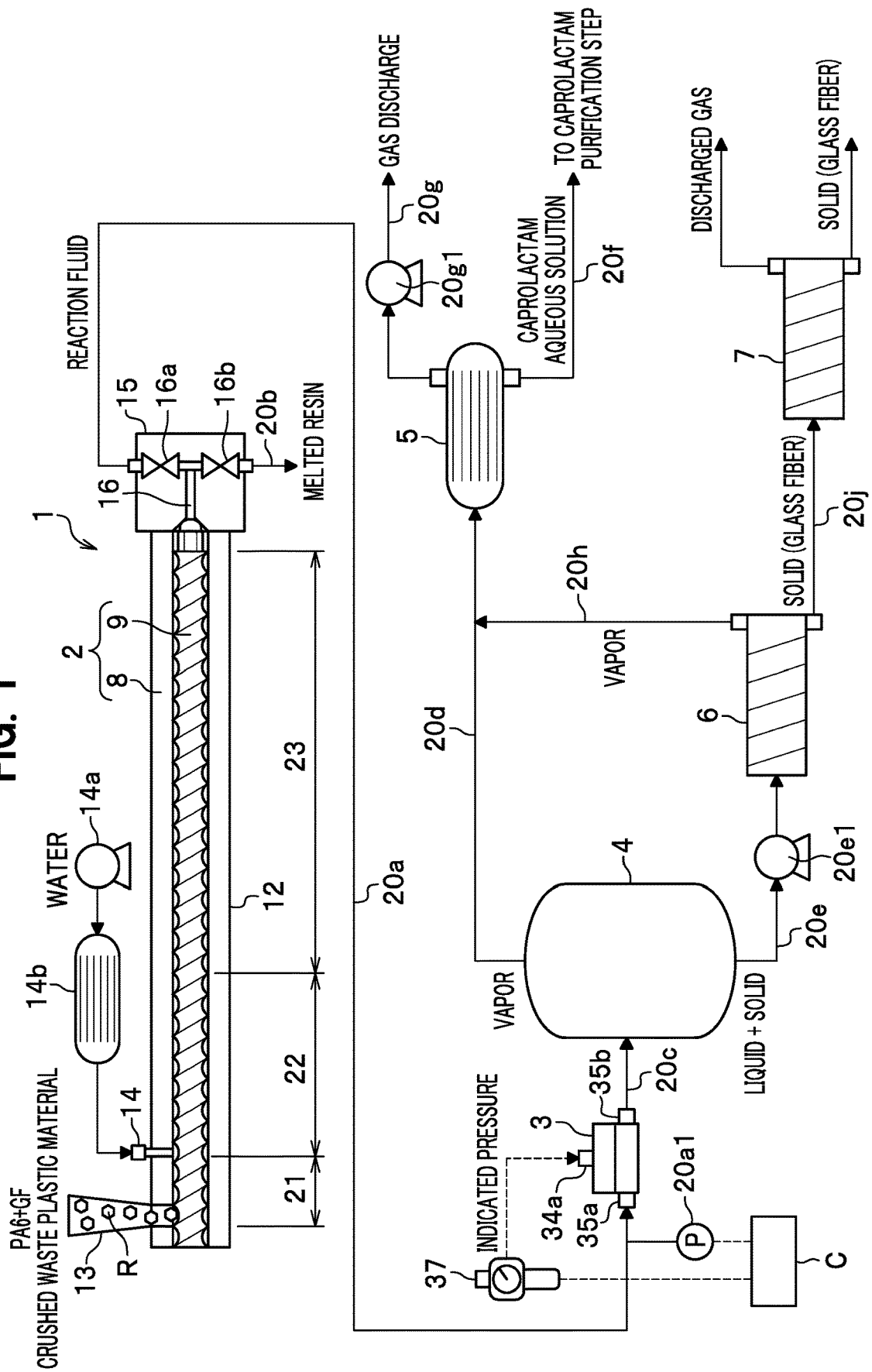
FIG. 1 is an explanatory configuration diagram of a continuous hydrolyzation apparatus according to an embodiment of the present disclosure.

As shown in FIG. 1, a continuous hydrolyzation apparatus 1 of this embodiment mainly includes a hydrolysis reaction container 2, a back-pressure valve 3, a flash tank 4, a condenser 5, a first dryer 6, and a second dryer 7.

The hydrolysis reaction container 2 of this embodiment is assumed to be formed from a two-shaft extruder that includes a heating tube 8 and a pair of screws 9. However, the hydrolysis reaction container 2 of the present disclosure is not limited to the foregoing configuration and may include a single-shaft screw 3 instead.

The heating tube 8 includes a cylinder 12 formed by concatenating cylinder blocks (not shown) in one direction, and a band heater (not shown) disposed on the outer periphery of the cylinder 12.

A fiber reinforced resin R (a crushed waste plastic material) being a waste material containing nylon 6 (PA6) and glass fibers (GF) is put through a hopper 13 into a rear end on an upstream side of the heating tube 8.

Meanwhile, a water feed port 14 is provided at a portion of the heating tube 8 on a downstream side of the hopper 13.

Water is fed from a water feed pump 14a to this water feed port 14 through a heater 14b. Here, the water to be fed from the water feed port 14 into the heating tube 8 has a high temperature and a high pressure as described later.

A heat insulation block 15 provided with a heater (not shown) is disposed at a front end on a downstream side of the heating tube 8. A flow passage 16 communicating with the inside of the heating tube 8 is formed in this heat insulation block 15, and a reaction-fluid valve 16a and a melted-resin valve 16b are disposed, respectively, on flow passages that are bifurcated on a downstream side of this flow passage 16.

Moreover, a pipe 20a is connected to the reaction-fluid valve 16a. A downstream side of this pipe 20a is connected to the back-pressure valve 3 to be described later.

A pipe 20b is connected to the melted-resin valve 16b. A downstream side of this pipe 20b is connected to a melted resin collection tank which is not shown.

Note that each of the reaction-fluid valve 16a and the melted-resin valve 16b corresponds to a "switch valve" as defined in the appended claim, and the pipe 20b corresponds to a "discharge flow passage" as defined in the appended claim.

The screws 9 are inserted into the heating tube 8 along a longitudinal direction of the heating tube 8.

The screws 9 are rotated by a screw driving mechanism, which is not shown, around shafts thereof in such a way as to convey the fiber reinforced resin R in the cylinder 12 forward.

The hydrolysis reaction container 2 provided with the above-described screws 9 inside the heating tube 8 includes a resin heater kneader 21, a resin water mixer 22, and a resin water reactor 23, which are arranged in this order from the upstream side to the downstream side of the heating tube 8.

Although illustration is omitted, the resin heater kneader 21 includes a feeder which melts and mixes the fiber reinforced resin R from the hopper 13 while heating the fiber reinforced resin R and feeds the fiber reinforced resin R to the upstream side, a compressor which compresses the melted fiber reinforced resin R from the feeder and feeds the fiber reinforced resin R to the upstream side, and a kneader which kneads the melted fiber reinforced resin R from the compressor while applying a shear force thereto.

The above-described resin heater kneader 21 forms a seal S (see FIG. 4) to be described later which is made of the melted fiber reinforced resin R.

Moreover, the water feed port 14 is formed immediately downstream of the resin heater kneader 21 in this embodiment.

The resin water mixer 22 mixes the melted fiber reinforced resin R with the water having the high temperature and the high pressure, and conveys this mixture to the upstream side of the heating tube 8.

Although illustration is omitted, the resin water mixer 22 includes a feeder which mixes the melted fiber reinforced resin R from the resin heater kneader 21 with the water while applying the heat and feeds the mixture to the upstream side, a compressor which compresses the mixture of the melted fiber reinforced resin R and the water from the feeder and feeds the compressed mixture to the upstream side, and a kneader which kneads the compressed mixture from the compressor while applying a shear force thereto.

The resin water reactor 23 conveys the mixture of the melted fiber reinforced resin R and the water from the resin water mixer 22 to the upstream side and induces a reaction between the fiber reinforced resin R and the water under a prescribed pressure.

A depolymerization reaction takes place in the hydrolysis reaction container 2 of this embodiment by hydrolyzing the amide bond in nylon 6 that constitutes the fiber reinforced resin R. To be more precise, the fiber reinforced resin R and the water are transformed into a reaction fluid including the glass fibers and a hydrolysis product containing caprolactam monomer. Moreover, depending on the type of the hydrolysis product, the depolymerization reaction may bring about a depolymerization product that involves an intermolecular dehydration reaction.

Next, the back-pressure valve 3 will be described. As mentioned earlier, the back-pressure valve 3 of this embodiment is connected to the downstream side of the pipe 20a. Meanwhile, the back-pressure valve 3 is connected through a pipe 20c to the flash tank 4 that is disposed on the downstream side of the back-pressure valve 3.

In other words, in the back-pressure valve 3, an inlet 35a for the reaction fluid to be sent out of the hydrolysis reaction container 2 is set to the pipe 20a side and an outlet 35b to send out the reaction fluid to the flash tank 4 is set to the pipe 20c side.

Here, reference sign 34a in FIG. 1 denotes an indicated pressure port of the back-pressure valve 3 to be described later, and reference sign 37 therein denotes a pressure generator such as a compressor to apply a prescribed indicated pressure to this indicated pressure port 34a.

Figure 2:
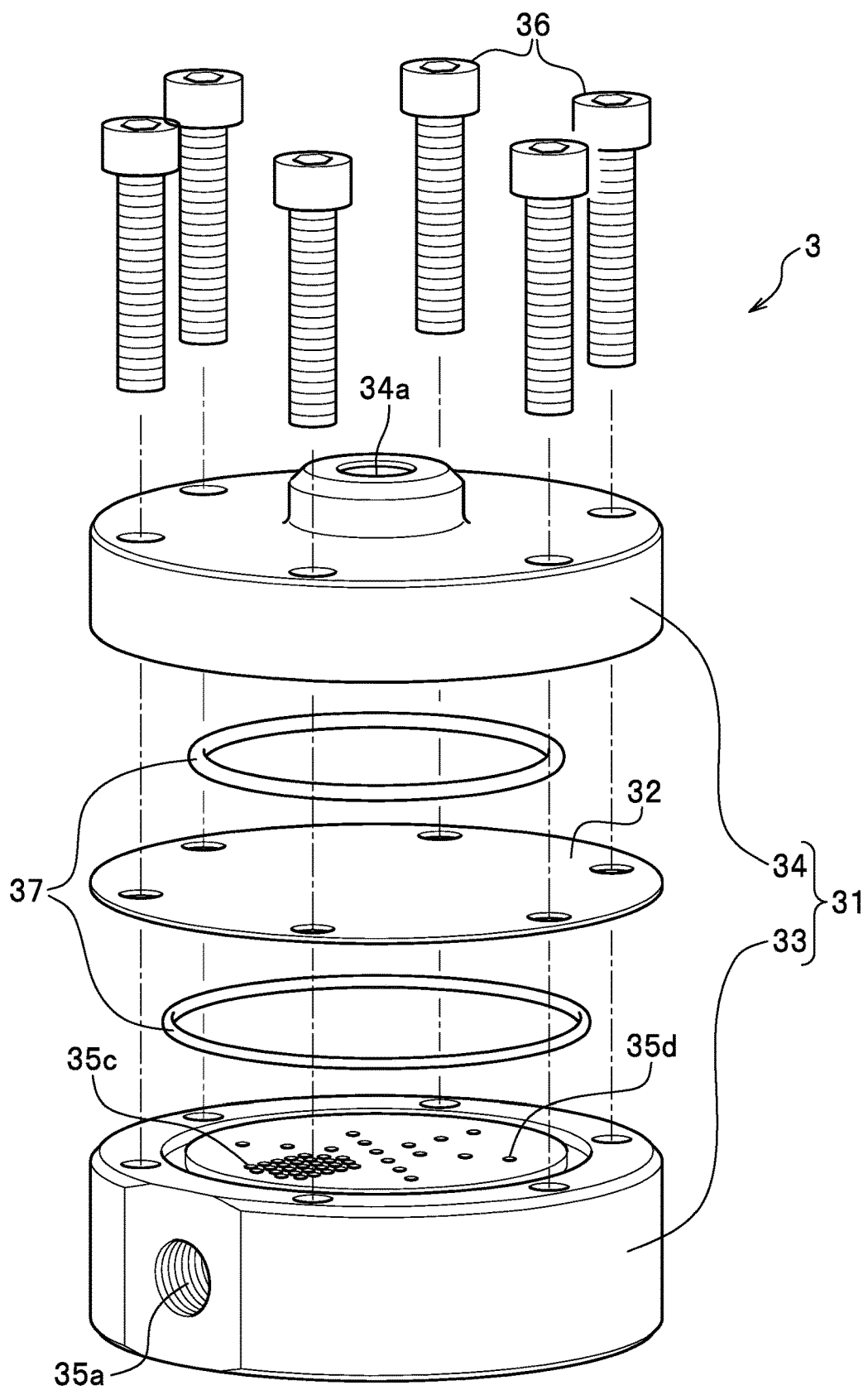
FIG. 2 is an exploded perspective for explaining a configuration of a back-pressure valve in the continuous hydrolyzation apparatus in FIG. 1.
Figure 3:
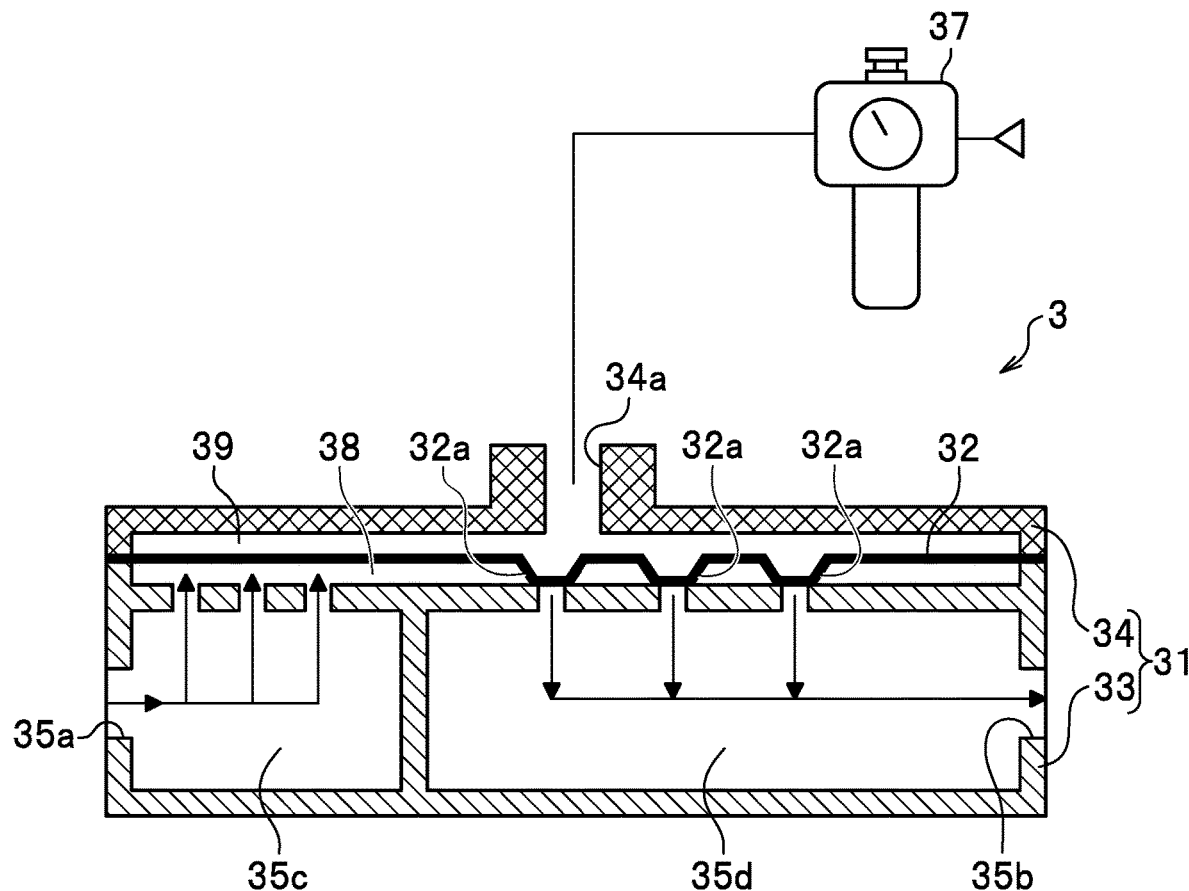
FIG. 3 is a schematic cross-sectional view for explaining an operation of the back-pressure valve in FIG. 2.

FIG. 2 is an exploded perspective of the back-pressure valve 3. FIG. 3 is a schematic cross-sectional view of the back-pressure valve 3.

As shown in FIG. 2, the back-pressure valve 3 includes a diaphragm 32, which serves as a pressure regulation valve to maintain an open valve state at a predetermined pressure or above to promote a hydrolysis reaction in the resin water reactor 23 (see FIG. 1) of the hydrolysis reaction container 2 (see FIG. 1).

To be more precise, the back-pressure valve 3 includes a casing 31, and the diaphragm 32 disposed in the casing 31.

The casing 31 includes a casing body 33 and a lid body 34.

The diaphragm 32 is disposed between the casing body 33 and the lid body 34 through the intermediary of an O-ring 37, thereby partitioning between a liquid chamber 38 (see FIG. 3) formed close to the casing body 33 and an indicated pressure chamber 39 (see FIG. 3) formed close to the lid body 34.

In FIG. 2, reference sign 36 denotes a bolt to fasten the casing body 33 to the lid body 34, and reference signs 35c and 35d denote reaction-fluid flow passages to be described below.

As shown in FIG. 3, the casing body 33 includes a first reaction-fluid flow passage 35c communicating with the liquid chamber 38 and the reaction-fluid inlet 35a, and a and a second reaction-fluid flow passage 35d communicating with the liquid chamber 38 and the reaction-fluid outlet 35b.

Incidentally, the back-pressure valve 3 is set to a closed state as shown in FIG. 3 by closing this second reaction-fluid flow passage 35d with a valve portion 32a of the diaphragm 32.

The lid body 34 includes the indicated pressure port 34a communicating with the indicated pressure chamber 39.

In the above-described back-pressure valve 3, an indicated pressure is applied to the indicated pressure port 34a by using the pressure generator 37 (see FIG. 1). This indicated pressure can be set to such a pressure (the prescribed pressure) that promotes the hydrolysis reaction in the resin water reactor 23 (see FIG. 1) of the hydrolysis reaction container 2 (see FIG. 1).

In other words, by setting the upstream side of the back-pressure valve 3 equal to or above the prescribed pressure to promote the hydrolysis reaction as described above, the back-pressure valve 3 maintains the open valve state (not shown) in which the valve portion 32*a* of the diaphragm 32 opens the second reaction-fluid flow passage 35*d*.

Moreover, the back-pressure valve 3 is configured such that a controller C adjusts an opening degree thereof based on a detection signal from a pressure sensor 20*a*1 provided on the pipe 20*a*. Note that control procedures by the controller C (see FIG. 1) will be explained together with a continuous hydrolyzation method to be described later.

Back to FIG. 1, the flash tank 4 accepts the reaction fluid having the high temperature and the high pressure which is sent out of the back-pressure valve 3 through the pipe 20*c* and decompresses the reaction fluid. In this flash tank 4, the reaction fluid is separated into a gas phase containing vapor of caprolactam which is the hydrolysis product as well as the water vapor and the like, and into a non-gas phase including a caprolactam aqueous solution as well as the glass fibers and the like.

The vapor containing the caprolactam vapor, the water vapor, and the like is sent out to the condenser 5 through a pipe 20*d*.

On the other hand, the liquid including the caprolactam aqueous solution and solids inclusive of the glass fibers are sent out to the first dryer 6 through a pipe 20*e* provided with a slurry pump 20*e*1.

The condenser 5 sends the caprolactam aqueous solution, which is a condensed liquid of the vapor containing the vapor of caprolactam, the water vapor, and the like sent out of the flash tank 4 through the pipe 20*d*, to a caprolactam purification system, which is not shown, through a pipe 20*f*. Caprolactam purified in this caprolactam purification system is used again as a raw material of nylon 6.

Note that gas components separated by the condenser 5 are discharged from the condenser 5 through a pipe 20*g* provided with a discharge pump 20*g*1.

Each of the first dryer 6 and the second dryer 7 in this embodiment is assumed to be a dryer including a rotary heating drum such as a rotary kiln.

The first dryer 6 heats the mixture of the caprolactam aqueous solution and the glass fibers sent out of the flash tank 4 through the pipe 20*e* at a first temperature at least equal to or above the boiling point of caprolactam under an atmospheric pressure. The first dryer 6 sends out vapor containing the caprolactam vapor, the water vapor, and the like through a pipe 20*h* which is joined to the middle of the pipe 20*d*. This vapor is passed through the condenser 5, thereby being separated into the gas components to be discharged and the caprolactam aqueous solution to be purified.

The first dryer 6 sends out solid components including the moist glass fibers after being dried at the first temperature to the second dryer 7 by using a conveyor unit 20*j* such as a belt conveyor.

The second dryer 7 heats the solid components sent out of the first dryer 6 at a second temperature which is higher than the first temperature. The second dryer 7 dries the moist solid components, thus separating the glass fibers therefrom. The separated glass fibers are used again as recycled fibers.

Gas components separated by the second dryer 7 are subjected to bubbling cleaning and the like as appropriate and are then discharged to the atmosphere.

<Continuous Hydrolyzation Method>

Next, a continuous hydrolyzation method of this embodiment will be described while explaining specific operating conditions of the continuous hydrolyzation apparatus 1 (see FIG. 1).

Figure 4:
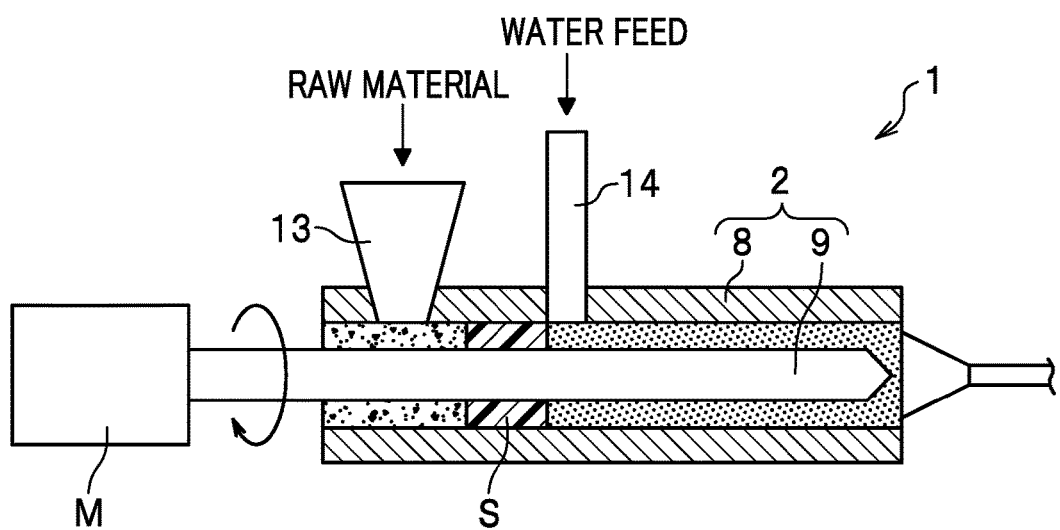
FIG. 4 is a schematic diagram for explaining an operation of a hydrolysis reaction container in the continuous hydrolyzation apparatus in FIG. 1.

FIG. 4 is a schematic diagram for explaining an operation of the hydrolysis reaction container 2 of the continuous hydrolyzation apparatus 1 in FIG. 1. In the following, a description will be given of the continuous hydrolyzation method with reference to FIGS. 1 to 4.

According to the continuous hydrolyzation method of this embodiment, the fiber reinforced resin R is continuously hydrolyzed by kneading the fiber reinforced resin R (the hydrolytic resin composition containing the fibers) by applying heat and pressure while conveying the fiber reinforced resin R and the water from the upstream side to the downstream side of the heating tube 8 by using the screws 9 inserted into the heating tube 8.

To be more precise, this continuous hydrolyzation method includes the steps of putting the fiber reinforced resin R as a raw material into the heating tube 8, forming the seal S (see FIG. 4) at a predetermined position in a longitudinal direction of the heating tube 8 for sealing a gap to be formed between the heating tube 8 and the screws 9 by using the fiber reinforced resin R melted by heat application in the heating tube 8, and inducing a reaction between the fiber reinforced resin R and water by putting the water into a downstream side of the seal S in the heating tube 8.

As discussed earlier, the fiber reinforced resin R serving as the raw material in this embodiment is assumed to be the mixture of nylon 6 as a matrix resin and the glass fibers. However, the fiber reinforced resin R applicable to the present disclosure is not limited to a particular resin as long as the resin has a hydrolytic property.

Examples of other matrix resins constituting the fiber reinforced resin R include: polyamides such as nylon 66 (PA66), nylon 12 (PA12), nylon 6T (PA6T), nylon 6/12 (PA6/12), and nylon 6/10 (PA6/10); polyesters such as polyethylene terephthalate (PET), polytrimethylene terephthalate (PTT), polyebutylene terephthalate (PBT), polyethylene naphthalate (PEN), and polybutylene naphthalate (PBN); thermoplastic elastomers (TPC) having hydrolytic binding sites.

Meanwhile, examples of the fibers include carbon fibers, basalt fibers, metallic fibers, silicon carbide fibers, aramid fibers, boron fibers, alumina fibers.

In the continuous hydrolyzation method of this embodiment, a target temperature for the resin water reactor 23 of the hydrolysis reaction container 2 and the indicated pressure in the back-pressure valve 3 are set up to begin with.

The target temperature (a reaction temperature) in this embodiment on the assumption of the hydrolysis of nylon 6 is, for example, equal to or above 320° C. and equal to or below 370° C., or around 350° C. By setting the reaction temperature in the resin water reactor 23 as described above, it is possible to improve productivity of a nylon 6 thermolysis product while achieving reduction in size of the continuous hydrolyzation apparatus 1.

The indicated pressure in the back-pressure valve 3 determines the reaction pressure in the resin water reactor 23 at the time of a steady operation of the continuous hydrolyzation apparatus 1.

A reaction pressure in the resin water reactor 23 is set to, for example, at least 4% above a saturation pressure at the target temperature (the reaction temperature). To be more precise, the reaction pressure is set equal to or above 16 MPa and equal to or below 20 MPa, or around 18 MPa, for example, in the case where the target temperature (the reaction temperature) is set within the aforementioned range. By setting the indicated pressure in the back-pressure valve 3 so as to achieve the above-mentioned reaction pressure, the continuous hydrolyzation apparatus 1 is stably operated while avoiding boil in the hydrolysis reaction container 2 in case of a variation of the target temperature (the reaction temperature). Moreover, the seal S (see FIG. 4) to be described later is stably maintained by setting the reaction temperature as described above.

Next, in this continuous hydrolyzation method, a temperature of the heat insulation block 15 (see FIG. 1) in the continuous hydrolyzation apparatus 1 is set to a temperature substantially equal to the target temperature (the reaction temperature) mentioned above.

Then, a predetermined amount of the fiber reinforced resin R as the raw material to be subjected to the hydrolysis is put into the heating tube 8 thorough the hopper 13 (see FIG. 1). Here, a temperature at a section between a block to send the nylon 6 fiber reinforced raw material to a block to feed the water is set, for example, equal to or below about 220° C. being the melting temperature of nylon 6, thus enhancing the sealing property while increasing viscosity of a material sealing portion formed from the melt of nylon 6.

The number of revolutions of each screw 9 rotated by a motor M (a screw driving mechanism) shown in FIG. 4 is not limited to a particular value. Nonetheless, the number of revolutions is in a range from about 100 to 400 rpm, for example. The continuous hydrolyzation apparatus 1 provided with the screws 9 in the hydrolysis reaction container 2 can crush the glass fibers having an average fiber length of about 0.3 mm contained in the raw material into an average fiber length of about 0.1 mm.

By conducting this crushing process, the fibers are kept from being entangled inside the back-pressure valve 3 (see FIG. 1) or being entangled on the slurry pump 20e1 (see FIG. 1).

Thereafter, when the raw material put in through the hopper 13 is conveyed by using the screws 9, the gap between each screw 9 and the heating tube 8 is sealed by the seal S formed from the melted raw material (the fiber reinforced resin R (see FIG. 1)) as shown in FIG. 4. Regarding the shapes of the screws, full flight screws for conveying the material, kneading discs for enhancing the kneading, and the like may be arranged as appropriate.

Next, in this continuous hydrolyzation method, the water having the high temperature and the high pressure is put (fed) into the downstream side of the seal S as shown in FIG. 4. Here, the water to be put in is heated to around 350° C. with the heater 14b (see FIG. 1) under the pressure around 18 MPa.

When the outlet of the hydrolysis reaction container 2 is closed, the pressure of the mixture fluid of the melted resin and the water put between the heating tube 8 and the screw 9 is kept high.

A volume of the hydrolysis reaction container 2 is equivalent to the gap between the heating tube 8 and the screws 9. Assuming that V is the volume of the hydrolysis reaction container 2, Q1/h is a melt volume flow rate of the resin raw material, and Q2/h is a volume flow rate of the water, then retention time t(h) of the mixture fluid of the melted resin and the water in the hydrolysis reaction container 2 satisfies the following relational expression:

retention time $t(h)=V/(Q1+Q2)$.

Next, a description will be given of a temperature range to be set to the hydrolysis reaction container 2.

In the hydrolysis reaction, reaction time becomes longer as the temperature is lower and the reaction time becomes shorter as the temperature is higher.

In the hydrolysis reaction container 2, a flow rate of the supplied raw material may possibly be reduced or the volume V of the hydrolysis reaction container 2 may possibly be increased in order to increase the above-mentioned retention time t(h). However, in a practical sense, the continuous hydrolyzation apparatus 1 provided with the hydrolysis reaction container 2 having the large volume for a small processing quantity leads to an increase in initial investment cost. Meanwhile, if the supply of the raw material is slowed down, productivity of the hydrolysis product in the continuous hydrolyzation apparatus 1 is deteriorated. Given the situation, the reaction temperature in the hydrolysis reaction container 2 is set equal to or above 320° C., for example.

Meanwhile, the saturation pressure of the vapor is increased if the reaction temperature in the hydrolysis reaction container 2 is set to the high temperature in order to promote the hydrolysis reaction in the hydrolysis reaction container 2 at the high reaction temperature. Hence, when the pressure of the vapor inside the hydrolysis reaction container 2 becomes relatively lower than the above-mentioned saturation pressure, the internal volume is rapidly increased. The hydrolysis reaction container 2 therefore needs to be operated at a pressure higher than the saturation pressure so as to avoid an unstable operation. In this regard, the reaction pressure in the hydrolysis reaction container 2 is equal to or below about 20 MPa and the reaction temperature is equal to or below 370° C., for example. By setting the reaction temperature as mentioned above, it is possible to obtain high-quality caprolactam that can increase the degree of polymerization when polymerizing caprolactam to form nylon 6.

Next, a description will be given more specifically of a pressure range to be set to the hydrolysis reaction container 2.

As described above, the pressure in the hydrolysis reaction container 2 is set to the higher pressure than the saturation pressure of the vapor at the set reaction temperature.

Table 1 shows the set temperature (° C.) of the hydrolysis reaction container 2 and the saturation pressure of the vapor at temperatures that vary within a predetermined amplitude from this set temperature (° C.).

TABLE 1

| Set temperature ° C. | Temperature amplitude ° C. | Saturation pressure MPa | Ratio relative to saturation pressure = 1 |
|---|---|---|---|
| 300 | 297 | 8.235 | 0.96 |
|  | 300 | 8.593 | 1.00 |
|  | 303 | 8.962 | 1.04 |
| 325 | 322 | 11.591 | 0.96 |
|  | 325 | 12.056 | 1.00 |
|  | 328 | 12.535 | 1.04 |
| 350 | 347 | 15.935 | 0.96 |
|  | 350 | 16.535 | 1.00 |
|  | 353 | 17.154 | 1.04 |

Table 1 shows values of the saturation pressure of the vapor (MPa) at the temperature amplitude (° C.) of ±3° C. relative to the respective set temperatures (° C.) of 300° C., 325° C., and 350° C. Here, the amplitude of ±3° C. takes account of the presence of the temperature amplitude of 2° C. to 3° C. in general temperature control.

Moreover, the set pressure (MPa) of the hydrolysis reaction container 2 takes account of a state of operation at the temperature ±3° C. In other words, the set pressure (MPa) of the hydrolysis reaction container 2 in this embodiment considers the pressure of at least 4% or more than the saturation pressure of the vapor at the set temperature as a desirable pressure range. To be more precise, as shown in Table 1 as an example, the set pressure (MPa) of the hydrolysis reaction container 2 is set to 18 MPa provided with a margin relative to the saturation pressure of the vapor at 17.154 MPa (which is 4% & more than the case where the saturation pressure is set to 1) at the set temperature (° C.) of 350° C.

The reaction time (the retention time) in the hydrolysis reaction container 2 may be set to at least about 20 minutes in the case of the set temperature of 320° C., at least about 10 minutes in the case of the set temperature of 370° C., or at least about 15 minutes in the case of the set temperature of 350° C.

An added water concentration may be set in a range from 10% to 80%. The added water concentration is defined by the following expression:

Added water concentration $X(\%) = 100 \cdot W2/(W1+W2)$, (in the expression, W1 is an amount of supply (kg/h) of the raw material and W2 is a feeding amount of water (kg/h)).

Here, setting the added water concentration equal to or above 10% makes it possible to achieve uniform contact mixture of the raw material and the water and to improve the yield of caprolactam. Meanwhile, setting the added water concentration equal to or below 80% makes it possible to maintain a relatively high caprolactam concentration in a caprolactam solution generated in a subsequent process and to reduce energy for concentrating caprolactam at the time of purification. Incidentally, the continuous hydrolyzation method of this embodiment assumes the added water concentration of about 50%.

Meanwhile, in the continuous hydrolyzation apparatus 1 immediately after start-up, the temperature of the melted resin reaching the heat insulation block 15 (see FIG. 1) disposed on the upstream side of the heating tube 8 is low and its viscosity is high.

Accordingly, the continuous hydrolyzation method of this embodiment provides the pipe 20b (see FIG. 1) as the discharge flow passage for separately collecting the melted resin during a period before causing the continuous hydrolyzation apparatus 1 to transition to the steady operation.

Moreover, during the period before the transition to the steady operation, the reaction-fluid valve 16a is closed and the melted-resin valve 16b is open.

In this way, the melted resin having the high viscosity is collected through the pipe 20b.

Furthermore, the melted-resin valve 16b is gradually closed in this continuous hydrolyzation method. Accordingly, the pressure in the resin water reactor 23 (see FIG. 1) of the hydrolysis reaction container 2 is gradually increased as the melted fiber reinforced resin R is conveyed to the upstream side by using the screws 9. At the time when the temperature and the pressure in the resin water reactor 23 reach the prescribed pressure and the target temperature (the reaction temperature), the continuous hydrolyzation apparatus 1 transitions to the steady operation.

Then, the reaction-fluid valve 16a is opened when the continuous hydrolyzation apparatus 1 transitions to the steady operation. The reacting fluid containing the hydrolysis product is sent out to the flash tank 4 through the pipe 20a provided with the back-pressure valve 3 and through the pipe 20c.

In this instance, the back-pressure valve 3 maintains the prescribed pressure in the resin water reactor 23 based on the preset indicated pressure.

Meanwhile, the back-pressure valve 3 increases the opening degree when the pressure between the hydrolysis reaction container 2 and the back-pressure valve 3 (the pressure in the pipe 20a) reaches a preset second pressure (a pressure threshold) which is higher than the prescribed pressure (a first pressure) to promote the hydrolysis reaction in the hydrolysis reaction container 2.

To be more precise, based on the detection signal from the pressure sensor 20a1 disposed in the pipe 20a, the controller C causes the back-pressure valve 3 to increase the opening degree when the aforementioned pressure reaches the preset second pressure (the pressure threshold) higher than the prescribed pressure (the first pressure).

Incidentally, the second pressure (the pressure threshold) is defined based on the assumption of a case where the glass fibers unexpectedly block up the back-pressure valve 3. The controller C clears the block-up in the back-pressure valve 3 by increasing the opening degree of the back-pressure valve 3 which is triggered by the second pressure (the pressure threshold). On the other hand, when the controller C determines from the detection signal from the pressure sensor 20a1 that the pressure in the pipe 20a falls below the second pressure (the pressure threshold), the controller C discontinues the instruction to the back-pressure valve 3. Accordingly, the back-pressure valve 3 is put back to the open valve state in accordance with the indicated pressure at the beginning.

Meanwhile, in this continuous hydrolyzation method, caprolactam contained in the gas phase in the flash tank 4 as described above is collected by the condenser 5. On the other hand, caprolactam contained in the non-gas phase (a liquid phase) in the flash tank 4 is collected through the first dryer 6 and the condenser 5 as mentioned above.

On the other hand, the glass fibers contained in the non-gas phase (the liquid phase) in the flash tank 4 are collected through the first dryer 6 and the second dryer 7.

<Operation and Beneficial Effects>

Next, operation and effects of the continuous hydrolyzation apparatus 1 and the continuous hydrolyzation method according to this embodiment will be described.

In the continuous hydrolyzation apparatus 1 of this embodiment, the hydrolysis is continuously carried out in the hydrolysis reaction container 2 by applying the heat and the pressure unlike the case of the conventional hydrolyzation apparatus (see Patent Document 1, for example) designed for a batch process. Accordingly, continuous hydrolyzation apparatus 1 can perform a high volume process by means of the continuous process on the fiber reinforced resin R (the hydrolytic resin composition).

Meanwhile, according to the continuous hydrolyzation apparatus 1, the hydrolytic resin composition may be subjected to the hydrolysis by using only the water without using a catalyst unlike the case of the conventional hydrolyzation apparatus designed for the batch process. Alternatively, the continuous hydrolyzation apparatus 1 may conduct the dehydration reaction together after the hydrolysis depending on the type of the hydrolytic resin composition.

According to the continuous hydrolyzation apparatus 1 of this embodiment, the volume or the thickness of the container does not have to be increased in order to ensure throughput per unit time unlike the case of the conventional hydrolyzation apparatus designed for the batch process. Thus, the continuous hydrolyzation apparatus 1 achieves reduction in size of the apparatus as compared to the conventional apparatus.

According to the continuous hydrolyzation apparatus 1, the fibers contained in the fiber reinforced resin R (the hydrolytic resin composition) are crushed by using the screws 9 in the hydrolysis reaction container 2. Thus, the fibers are effectively prevented from causing the block-up on the downstream side.

Meanwhile, according to the continuous hydrolyzation apparatus 1, the back pressure is released by using the back-pressure valve 3 that can adjust the opening degree, thus keeping the solids such as the glass fibers from remaining inside the hydrolysis reaction container 2 or the back-pressure valve 3.

The continuous hydrolyzation apparatus 1 adjusts the opening degree of the back-pressure valve 3 provided with the diaphragm 32 (the pressure regulation valve) depending on the indicated pressure. To be more precise, the diaphragm 32 (the pressure regulation valve) adjusts a cross-sectional area of the flow passage depending on the indicated pressure and discharges the solids such as the glass fibers when the cross-sectional area is increased. In this way, the continuous hydrolyzation apparatus 1 more reliably keeps the solids such as the glass fibers from remaining inside the hydrolysis reaction container 2 or the back-pressure valve 3.

In the continuous hydrolyzation apparatus 1, the back-pressure valve 3 increases the opening degree when the pressure between the hydrolysis reaction container 2 and the back-pressure valve 3 reaches the preset second pressure which is higher than the first pressure to promote the hydrolysis reaction in the hydrolysis reaction container 2.

The above-described continuous hydrolyzation apparatus 1 more reliably keeps the solids such as the glass fibers from remaining therein.

The continuous hydrolyzation apparatus 1 is provided with the switch valves including the reaction-fluid valve 16a and the melted-resin valve 16b, which are provided between the hydrolysis reaction container 2 and the back-pressure valve 3.

The above-described continuous hydrolyzation apparatus 1 discharges unreacted substances sent out of the hydrolysis reaction container 2 during the period from the start-up to the steady operation after a lapse of a predetermined period. Thus, the unreacted substances are kept from remaining or blocking up inside the back-pressure valve 3. Moreover, the above-described continuous hydrolyzation apparatus 1 discharges the unreacted substances sent out of the hydrolysis reaction container 2, thus improving the degree of purity of the collected hydrolysis product.

The continuous hydrolyzation method of this embodiment includes the step of inducing a reaction between the fiber reinforced resin R (the hydrolytic resin composition) and water by putting the water into a downstream side of the seal S in the heating tube 8.

According to the above-described continuous hydrolyzation method, the fiber reinforced resin R (the hydrolytic resin composition) is effectively brought into the reaction with the water at a location closer to the upstream of the heating tube 8. This makes it possible to secure a longer section of the resin water reactor 23 in the hydrolysis reaction container 2, and to further increase the yield of the hydrolysis product to be collected.

Although the description has been given of a certain embodiment of the present disclosure, the present disclosure is not limited only to the described embodiment and may be carried out in various other modes.

According to the present disclosure, a hydrolytic resin composition is hydrolyzed by using water without a catalyst, and the reaction container decreases in size.

What is claimed is:

1. A continuous hydrolyzation apparatus comprising:
   a hydrolysis reaction container including a heating container including a feed portion for a hydrolytic resin composition and a feed portion for water;
   a kneader configured to knead the hydrolytic resin composition with the water in the heating container;
   a conveyor configured to convey the hydrolytic resin composition and the water to a downstream side in the heating container;
   a pressure regulation valve provided on a downstream side of the hydrolysis reaction container and configured to have a hydrolytic resin composition product flow to the downstream side through the pressure regulation valve while setting a pressure in the hydrolysis reaction container to a prescribed pressure to promote a hydrolysis reaction; and
   a seal formed at an upstream side of the feed portion for the water in a longitudinal direction of the heating container by using the hydrolytic resin composition melted under heat in the heating container, the seal being configured to seal a gap formed between the heating container and the conveyor.

2. The continuous hydrolyzation apparatus according to claim 1,
   wherein the pressure regulation valve is maintained in an open valve state at a predetermined pressure or above.

3. The continuous hydrolyzation apparatus according to claim 1,
   wherein the pressure regulation valve increases in opening degree in response to a pressure between the hydrolysis reaction container and the pressure regulation valve having reached a preset second pressure higher than a first pressure to promote a hydrolysis reaction in the hydrolysis reaction container.

4. The continuous hydrolyzation apparatus according to claim 1, further comprising:
   a switch valve between the hydrolysis reaction container and the pressure regulation valve; and
   a discharge flow passage extending from the switch valve to outside of the continuous hydrolyzation apparatus.

5. A continuous hydrolyzation method comprising:
   providing a hydrolytic resin composition and water into a heating container;
   continuously hydrolyzing the hydrolytic resin composition by kneading the hydrolytic resin composition and the water in the heating container and conveying the hydrolytic resin composition and the water from an upstream side to a downstream side of the heating container by a conveyor;
   forming a seal at an upstream side of a position where the water is provided in a longitudinal direction of the heating container by using the hydrolytic resin composition melted under heat in the heating container and sealing a gap formed between the heating container and the conveyor; and
   reacting the hydrolytic resin composition and the water by feeding the water to a downstream side of the seal in the heating container.

6. The continuous hydrolyzation method according to claim 5,
wherein the heating container includes a heating tube,
wherein the hydrolytic resin composition and the water is kneaded under heat and pressure by using a screw inserted into the heating tube while the hydrolytic resin composition and the water are conveyed from an upstream side to a downstream side of the heating tube by using the screw.

7. The continuous hydrolyzation apparatus according to claim 1,
wherein the hydrolytic resin composition contains fibers.

8. The continuous hydrolyzation apparatus according claim 1,
wherein the hydrolysis reaction container comprises a screw including the kneader and the conveyor.

* * * * *